US012783701B2

(12) United States Patent
Benavides

(10) Patent No.: US 12,783,701 B2
(45) Date of Patent: Nov. 3, 2026

(54) APPLICATION PROGRAMMING INTERFACE (API) BASED NETWORK SECURITY USING ZERO TRUST API ACCESS (ZTAA) WITH SECURITY POSTURE TAGS

(71) Applicant: Fortinet, Inc., Sunnyvale, CA (US)

(72) Inventor: Julian H. Benavides, Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 18/921,335

(22) Filed: Oct. 21, 2024

(65) Prior Publication Data

US 2026/0093830 A1 Apr. 2, 2026

Related U.S. Application Data

(63) Continuation-in-part of application No. 18/901,244, filed on Sep. 30, 2024.

(51) Int. Cl.
*G06F 21/62* (2013.01)

(52) U.S. Cl.
CPC .................................... *G06F 21/62* (2013.01)

(58) Field of Classification Search
CPC ........................................................ G06F 21/62
See application file for complete search history.

(56) References Cited

U.S. PATENT DOCUMENTS

| | | | | |
|---|---|---|---|---|
| 10,909,236 | B2 * | 2/2021 | Mehta | G06F 21/54 |
| 10,944,561 | B1 | 3/2021 | Cahill et al. | |
| 11,388,006 | B2 | 7/2022 | Wang et al. | |
| 11,595,372 | B1 | 2/2023 | Sharifi Mehr | |
| 11,962,704 | B1 * | 4/2024 | Valkaitis | H04L 9/0822 |
| 12,463,995 | B1 | 11/2025 | Welsh et al. | |
| 2021/0377273 | A1 | 12/2021 | Lu et al. | |
| 2022/0321362 | A1 | 10/2022 | Konda et al. | |
| 2023/0336592 | A1 | 10/2023 | Narayanaswamy et al. | |
| 2024/0348652 | A1 | 10/2024 | Desigan et al. | |
| 2025/0193240 | A1 * | 6/2025 | Bishop | H04L 63/20 |
| 2025/0202942 | A1 | 6/2025 | Kondapi et al. | |

* cited by examiner

*Primary Examiner* — Benjamin A Kaplan
(74) *Attorney, Agent, or Firm* — Law Office of Dorian Cartwright; Dorian Cartwright

(57) ABSTRACT

Responsive to the Application Programming Interface (API) consumption request, a security posture tag for to the specific API is calculated by a Zero Trust API Access (ZTAA) server and/or one or more agents running as daemons on one or more API network resources. The daemons can test the API network resources with API calls to generate initial security posture tags. Then the initial security posture tags are dynamically updated responsive to changes on the API network resources. API security rules relevant to the security posture tag of the API. Consumption of the API for allowed or denied per the API consumption request, according to the API consumption rate in view of API security rules associated with the API.

17 Claims, 8 Drawing Sheets

100

APPLICATION PROGRAMMING INTERFACE (API) BASED NETWORK SECURITY USING ZERO TRUST API ACCESS (ZTAA) WITH SECURITY POSTURE TAGS

CROSS-REFERENCES TO RELATED APPLICATIONS

The present patent application claims priority as a continuation-in-part under 35 U.S.C. 120, to U.S. application Ser. No. 18/901,244, filed Sep. 30, 2024, the contents of which are hereby incorporated in its entirety.

FIELD OF THE INVENTION

The invention relates generally to computer networks, and more specifically, to providing API-based network security using zero trust API access (ZTAA) with security posture tags associated with APIs.

BACKGROUND

Network security is critical for managing a large amount of users and a large amount of devices on private data communication networks, such as an enterprise network or a home network. Conventional network security operates by limiting access to a network. For example, virtual private networks (VPNs) are a form of network security that provides a secure connection for a user device over a public network to a private network. Another form of network access, zero trust network access (ZTNA), provides a secure connection for a user device over a public network to specific applications and services of a private network. These technologies allow and deny permission using a network access paradigm.

One problem with network security is the variance in security readiness between different devices on a private network. Each device has an individual profile with respect to operating system, hardware, software applications, network protocols, network communication ports, and the like. Furthermore, a baseline hardware or software can have different latest versions and latest patch levels that constantly change. Consequently, different devices require different network access policies for protection and pure network layer security protections can be lacking for this reason.

Moreover, because network security is driven by access to devices and services, access to a specific data file or to a specific API may differ on different devices and may differ on different services. In a data farm, data files are often moved around to optimize system level performance.

Although data files and APIs offer some internal protections, such as a password requirement to open a PDF file, the malicious actor already has access to the data file and has opportunity to hack the password.

Therefore, what is needed is a robust technique for providing API-based network security through ZTAA with security posture tags associated with APIs.

SUMMARY

To meet the above-described needs, methods, computer program products, and systems for providing ZTAA based on security posture tags associated with APIs.

In one embodiment, API consumption rates associated with a plurality of APIs that are requested for consumption from network resources are tracked. A request to consume a specific API is received, wherein the API consumption request is associated with a validated API key for a specific API of a plurality of APIs.

In one embodiment, responsive to the API consumption request, a security posture tag for to the specific API is calculated by a ZTAA server and/or one or more agents running as daemons on one or more API network resources. The daemons can test the API network resources with API calls to generate initial security posture tags. Then the initial security posture tags are dynamically updated responsive to changes on the API network resources.

In another embodiment, API security rules relevant to the security posture tag of the API. Consumption of the API for allowed or denied per the API consumption request, according to the API consumption rate in view of API security rules associated with the API.

Advantageously, network and network device performance are improved with better network security.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for ZTAA based on security posture tags associated with data files. For example, an application may use an API to call for results of a real-time Internet search, and access to those results can be subject to a consumption rate of searches using the API. The following disclosure is limited only for the purpose of conciseness, as one of ordinary skill in the art will recognize additional embodiments given the ones described herein.

I. Systems for ZTAA Using Security Posture Tags (FIGS. 1-3)

Figure 1:
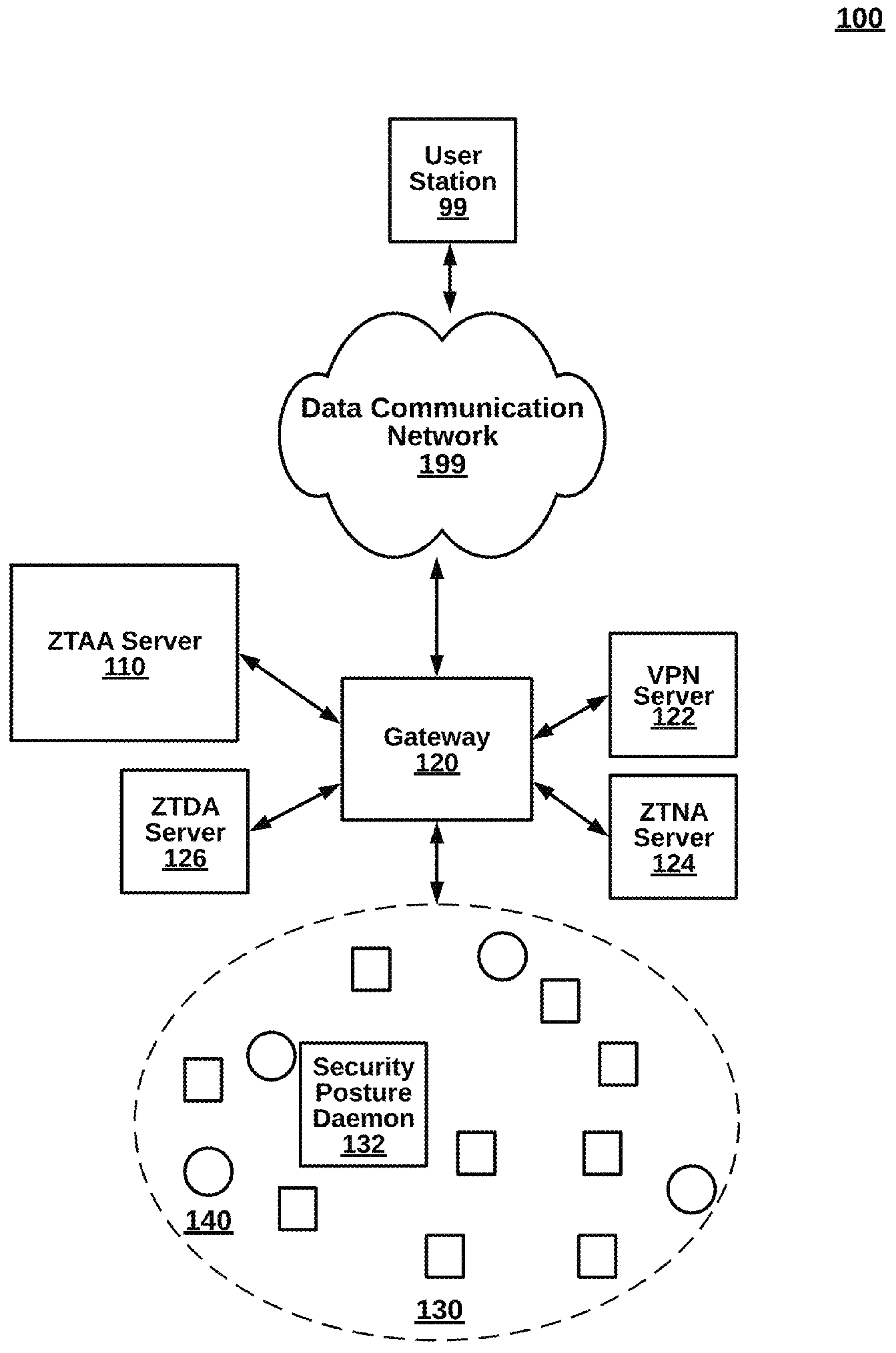
FIG. 1 is a high-level block diagram illustrating aspects of a system for providing ZTAA based on security posture tags associated with APIs, according to some embodiments.
Figure 6:
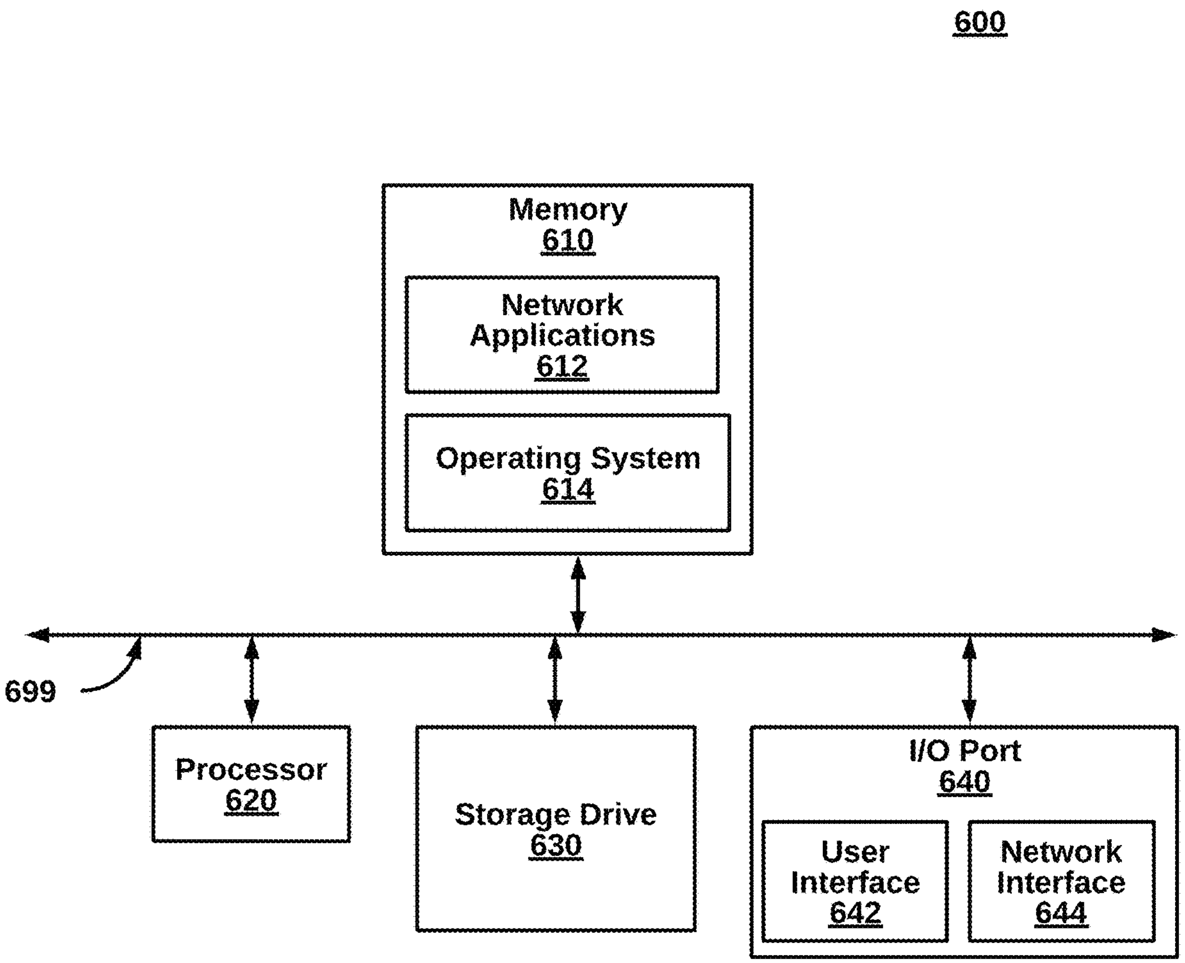
FIG. 6 is a block diagram illustrating an example computing device for the system of FIG. 1, according to an embodiment.

FIG. 1 is a high-level block diagram illustrating a system 100 for providing ZTAA based on security posture tags associated with APIs, according to an embodiment. The system 100 includes ZTAA server 110, a gateway 120 and APIs 140 (collectively). Other embodiments of the system 100 can include additional components that are not shown in FIG. 1, such as additional servers and gateways, along with Wi-Fi controllers, access points, routers and switches. One embodiment relies upon ZTAA network security without one or more of ZTDA, ZTNA and VPN security layers shown in FIG. 3. The components of system 100 can be implemented in hardware, software, or a combination of both. An example implementation of processor-based hardware components is shown in FIG. 6.

In one embodiment, components of the system 100 are coupled in communication over a private (or enterprise) network connected to a public network, such as the Internet. In another embodiment, system 100 is an isolated, private network, or alternatively, a set of geographically dispersed LANs. The components can be connected to the data communication system via hard wire (e.g., ZTAA server 110, gateway 120, VPN server 122 and ZTNA server 124). The components can also be connected via wireless networking (e.g., user station 99). The data communication network can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, 802.11be, Wi-Fi 6, Wi-Fi 6E, Wi-Fi 7 and the like. Components can use IPV4 or Ipv6 address spaces.

A novel network security layer protects APIs 140 using security posture tags. The ZTAA server 110 provides network security with selective access to APIs 130 exposed for consumption as guided by ZTAA network policies. A user, a network administrator, an API provider or an API creator can set consumption rate ceilings for APIs as a group or individual. The ZTAA server 110 can track consumption rate of an API and detect any related abuses. A specific API can be tracked for consumption with respect to an API network resource, a group of API network resources on one or more enterprise networks, a user station requesting consumption, or the like. Upon receiving an API consumption request, the ZTAA server 110 uses an existing security posture tag or calculates (or updates) an existing security posture on-the-fly. If an API consumption rate is above a threshold associated with the security posture, the consumption request is denied, due to a potential security issue. In some embodiments, notifications or other security actions are taken beyond access decision.

In general, API consumption involves a request to get data or perform specific actions, such as a GPS program retrieving real-time traffic data for routing decisions from an online API resource. One or more APIs are exposed or published by an API network resource for use by others to develop their own software applications and products. The API can define how two processes communicate with each other using requests and responses. Further details of the ZTAA server 110 are set forth below. Another network security layer protects individual data files using security posture tags. The ZTDA server 124 provides selective access to data files 130 as guided by ZTDA network policies. A user that creates a data file can also set or modify ZTDA data access policies apart from VPN and ZTNA and other network access policies. In an example process, and as shown in FIG. 3, a user station 99 establishes a secure connection to the enterprise network, as a whole, over data communication network 199 through the VPN network access layer 310. Next, user station 99 establishes permissions to certain applications and/or services on the enterprise network through the ZTNA network access layer 320. Finally, user station 99 accesses a specific data file from data files 130 and APIs 140 through the data access layer 330 (e.g., ZDTA layer) or accesses specific API from APIs 140 through the API access layer 335 (e.g., ZTAA layer), as described herein. The document (or file) security layer 340 (e.g., password for document enforced by application) may be accessed through a separate request at a local software process (e.g., on user station 99) once the data file has been retrieved. Each of VPN, ZTNA and ZTDA can have separate policies, some of which are harmonic and some of which are contradictory. For instance, a VPN and/or ZTNA time to live (TTL) parameter may still be valid while a TTL set for data access has already expired. As a result, the data access policies constrict access more than VPN or ZTNA in this instance. In other instances, data access policies are more liberal than network access policies. In yet another instance, ZTDA controls data file access without any network access services through VPN and/or ZTNA. In some cases, a data file subject to ZTDA policies calls an API subject to ZTAA policies, and in other cases, an called API subject to ZTAA policies calls a data file subject to ZTDA policies. In another case, the API is treated as a data file access, so ZTDA scrutiny is imposed in addition to ZTAA scrutiny. In other cases, APIs are not also subject to ZTDA scrutiny. More detailed embodiments of the ZTDA server 110 are set forth below with respect to FIG. 2B.

In operation, instances of security posture daemon 132 executes on devices of the data farm storing data files 130 and APIs 140 to maintain security posture tags. The security posture daemon 132 can interrogate a device and surroundings to collect security posture information and to create and update security posture tags. The security posture information can include any information related to API access security and/or to data access security. There can be static information of hardware configuration or operating system. The static information can be updated from time to time by new hardware configurations, hardware driver updates, new applications or operating system patches. There can also be dynamic information that snapshots current statistics, such as processor load, memory load or bandwidth. When an individual data file or API is moved from one hardware device or one LAN to another, or is moved within a hardware device or within a LAN, security posture daemon 132 initiates updates the security posture tags as needed.

The VPN server 122 and the ZTNA server 124 (or EMS server), work separately or together with ZTDA server 110. Prior to accessing data files, a user can authenticate with an application on the user device 199 that in turn authenticates with VPN server 122 and/or ZTNA server 124. Alternatively, a user can remotely connect through a browser to directly authenticate.

Figure 2A:
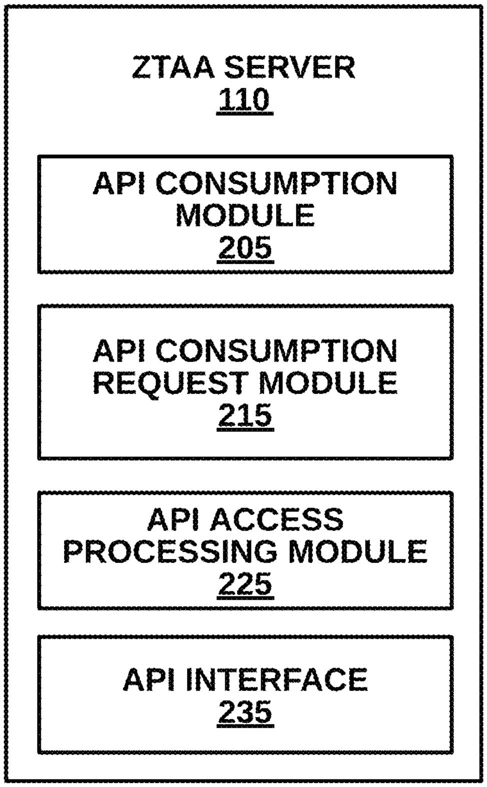
FIG. 2A is a more detailed block diagram illustrating a ZTAA server of the system of FIG. 1, according to an embodiment.
Figure 3:
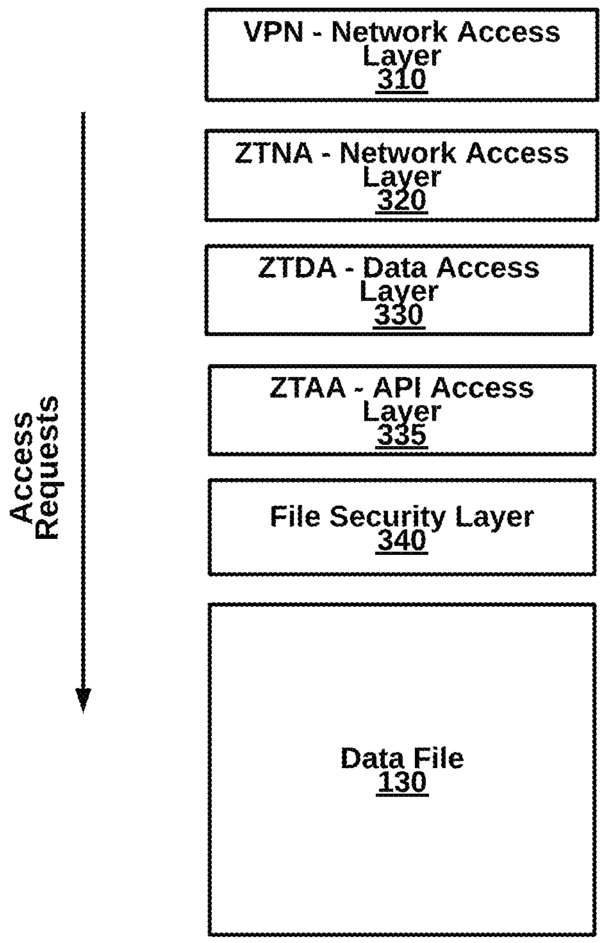
FIG. 3 is a more detailed block diagram illustrating an API security layer among different security layers associated with a data file, according to an embodiment.

FIG. 2A is a more detailed view of ZTAA server 110 of FIG. 1, according to an embodiment. The ZTAA server 110 further includes an API consumption tracking module 205, an API consumption request module 215, an API security tag module 225 and an API security rules module 235.

The API consumption tracking module 205 tracks API consumption rates associated with a plurality of APIs that are requested for consumption from network resources. In one instance, a count is incremented each time an API is called. The count over a window of time yields a consumption rate. Different APIs can have different consumption rates. In another instance, a pattern or profile of different APIs called by a user station is indicative of a specific attack that can be identified. Moreover, intensity for identified attacks can also be measured. Consumption rates can be set once or can be dynamically updated according to conditions.

For example, during high traffic periods, there may naturally be more API consumption, unrelated to security threats.

The API consumption request module 215 can receive and process a request to call a specific API for consumption. First, the API key may be validated. After processing, the consumption request module 215 allows or denies access to the API for consumption per the API consumption request according to the API consumption rate in view of API security rules associated with the API. If allowed, the request can be forwarded to a backend server to perform the function. If denied, the request is dropped without further action. A notification or other security action can be taken, in some embodiments, in addition to the denial.

The API security tag module 225, responsive to the API consumption request, calculating a security posture tag for to the specific API by one or more agents running as daemons on one or more API network resources. In an embodiment, the daemons test the API network resources with API calls to generate initial security posture tags. The initial security posture tags are dynamically updated responsive to changes on the API network resources.

The API security rules module 235 can identify API security rules relevant to the security posture tag of the API. The API rules can be specific to consumption rates. In an example, the consumption rates are tied to historical profiles of anomalous behavior. Some API security rules can detect patterns of consumption, such as calling API 3 times, then API 2 one time, as an attack signature. Rules can be based on an API or API category, a user station, current network statistics, hardware and software configurations of API providers, and the like.

Figure 2B:
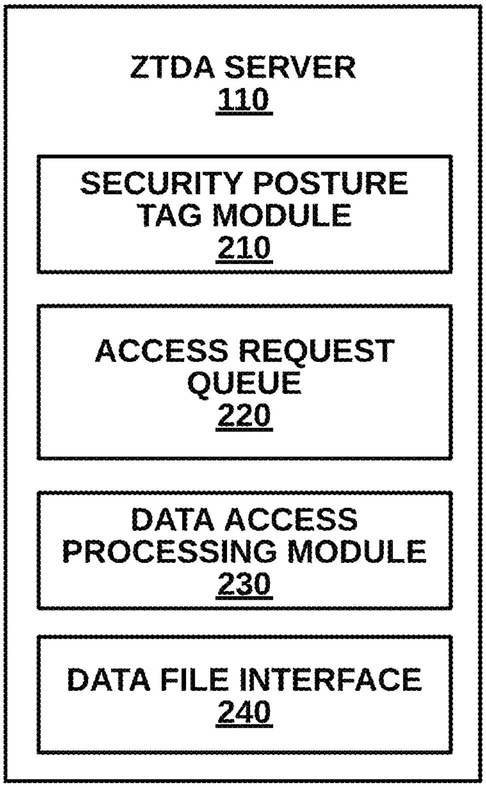
FIG. 2B is a more detailed block diagram illustrating a ZTDA server of the system of FIG. 1, according to an embodiment.

FIG. 2B is a more detailed view of ZTDA server 110 of FIG. 1, according to an embodiment. The ZTDA server 110 further includes a security posture tag module 210, an access request queue 220, a data access processing module 230 and a data file interface 240.

The security posture tag module 210, in an embodiment, calculates security posture tags from security posture updates about data files gathered from a plurality of security posture agents executing on a plurality of network devices. The calculation a comparison of previous data to current data to identify changes. Calculations can be triggered by any of a data file access request, a change in security posture for a data file, or periodic calculations.

The access request queue 220 can receive a request for access including a name of a data file. The request has established secured network access. Also, the request does not include a specific location of the data file.

The access processing module 230 receives a security posture tag associated with the data file. One or more ZTDA network policies are applied. Vulnerabilities can also be identified. These polices can be identified as corresponding to the request, or can be identified as corresponding to the data of the security posture tag.

The data file interface 240 provides access to the data file of the request, subject to application of the one or more ZTDA network policies identified as corresponding to the request. For example, the data file interface 240 connect with a data center for file storage. When the access requests are received, an index locates the data files to complete a connection. In some embodiments, the data file interface 240 maintains the index to translate an access request to a specific address on a backend. The index is updated when data files move from one location to another, whether between devices or within devices.

A data farm is one example implementation of data files. Multiple data files 130 and APIs 140 are shown without any tie to a specific device. Thus, storage is constantly optimized and reindexed. However, after optimization, one of the security posture daemons 132 that is resident on the same device calculates a security posture or at least provide relevant data for calculation. A data file can be a document, a record, log updates, an image, a video, a PDF file, DOCX file, a JPG file, or any other appropriate type. The data files can belong to one owner or to multiple owners. The data file type can be random, or an all be the same, in a different implementation. Some example implementations include Dropbox which is a cloud storage solution.

The movement of data files on a backend of the data farm is preferably transparent to user device 99. An index between a name of a data file and a location on a data farm, is created and maintained to enable transparency. As a result, the name of a specific datafile, in some cases, is not related to a backend location.

There are numerous variations to those that are listed herein, that would be apparent to one of ordinary skill in the art, given the disclosure herein.

II. Methods for ZTAA Using Security Posture Tags (FIGS. 4-5)

Figure 4A:
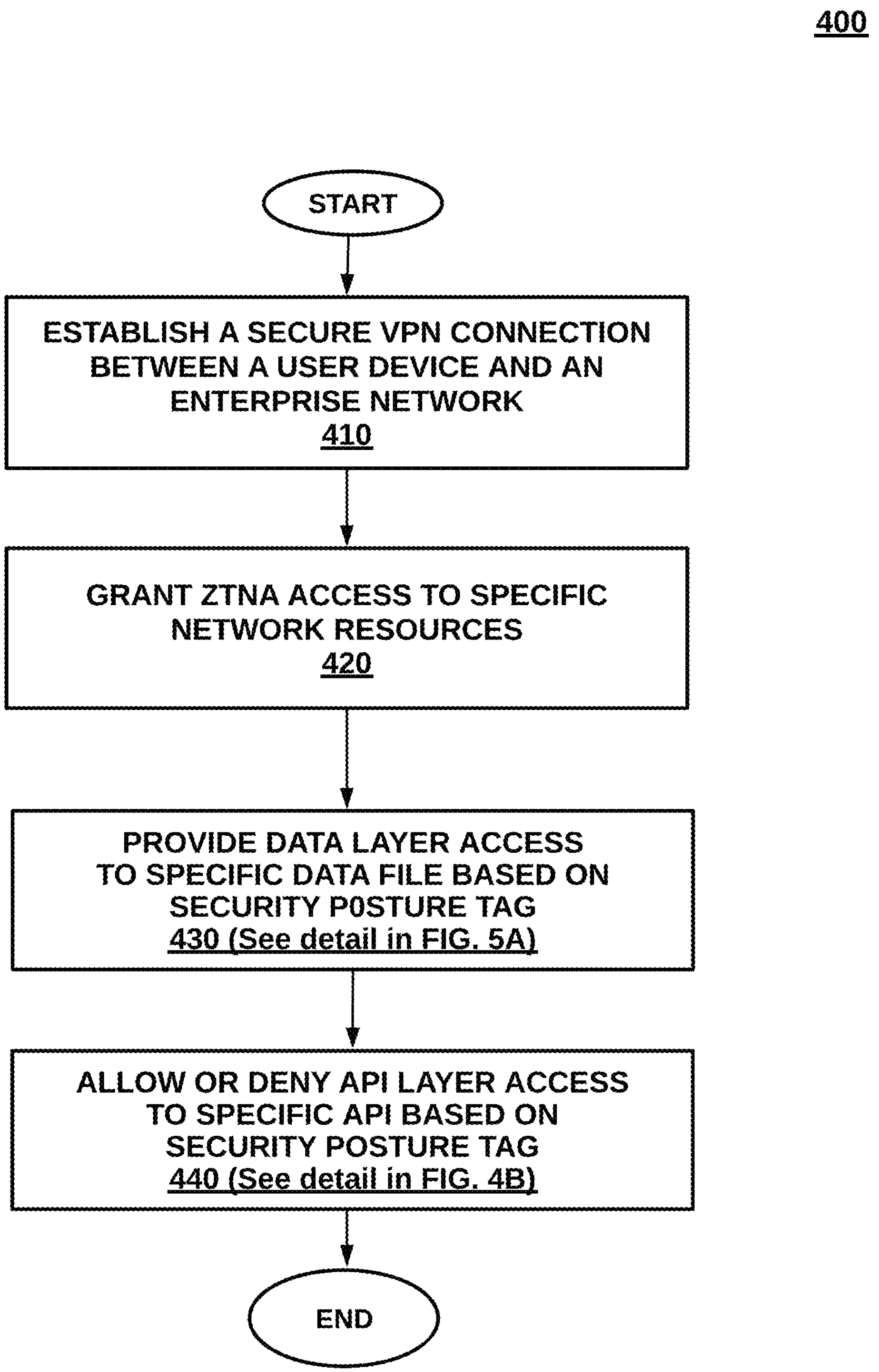
FIGS. 4A and 4B are high-level flow diagrams of a method for providing ZTAA based on security posture tags associated with APIs, according to an embodiment.

FIG. 4A is a high-level flow diagram of a method 400 for providing ZTAA based on security posture tags associated with APIs, according to an embodiment. The method 400 can be implemented by, for example, system 100 of FIG. 1. The specific grouping of functionalities and order of steps are a mere example as many other variations of method 500 are possible, within the spirit of the present disclosure. Other variations are possible for different implementations.

At step 410, secure VPN connection is established between a user device and an enterprise network. At step 420, ZTNA access is granted to specific network resources. At step 430, data layer access is provided to a specific data file. At step 440, API layer access is provided to a specific API, as described below in more detail.

Figure 4B:
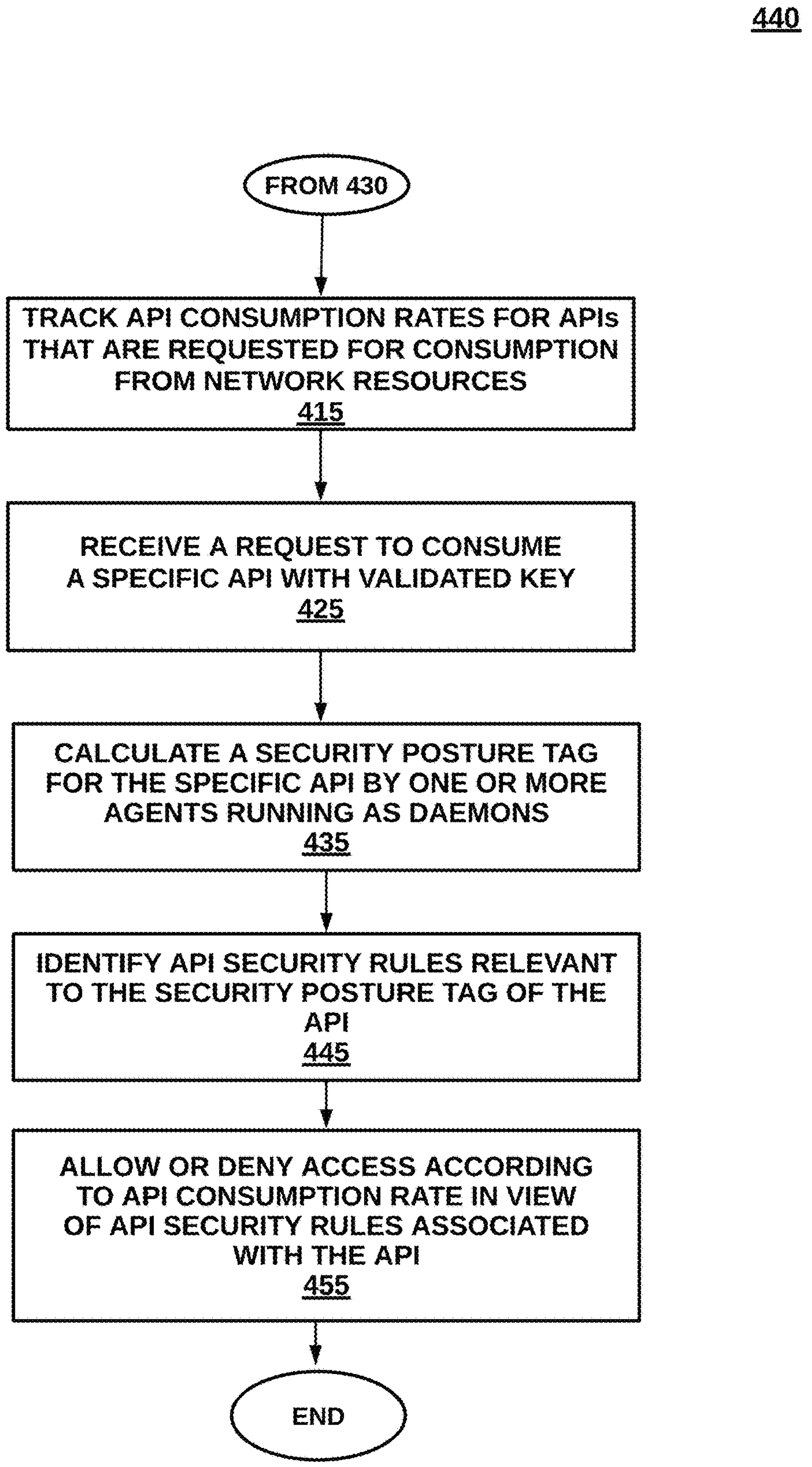

As shown in FIG. 4B, at step 415, API consumption rates associated with a plurality of APIs that are requested for consumption from one or more network resources are tracked. Daemons can locally track rates for APIs. In one embodiment, daemons report data upstream to an ZTAA server.

At step 425, a request to consume a specific API is received. The API consumption request is associated with a validated API key for a specific API of a plurality of APIs.

At step 435, responsive to the API consumption request, a security posture tag is calculated for the specific API by one or more agents running as daemons on one or more API network resources. The daemons test the API network resources with API calls to generate initial security posture tags. The initial security posture tags are dynamically updated responsive to changes on the API network resources. Alternatively, the daemons can send information to an API server for calculation. Also, the daemon can calculate security posture tags in conjunction with the API server.

At step 445, API security rules relevant to the security posture tag of the API are identified.

At step 455, access to the API for consumption is allowed or denied per the API consumption request according to the API consumption rate in view of API security rules associated with the API.

Figure 5A:
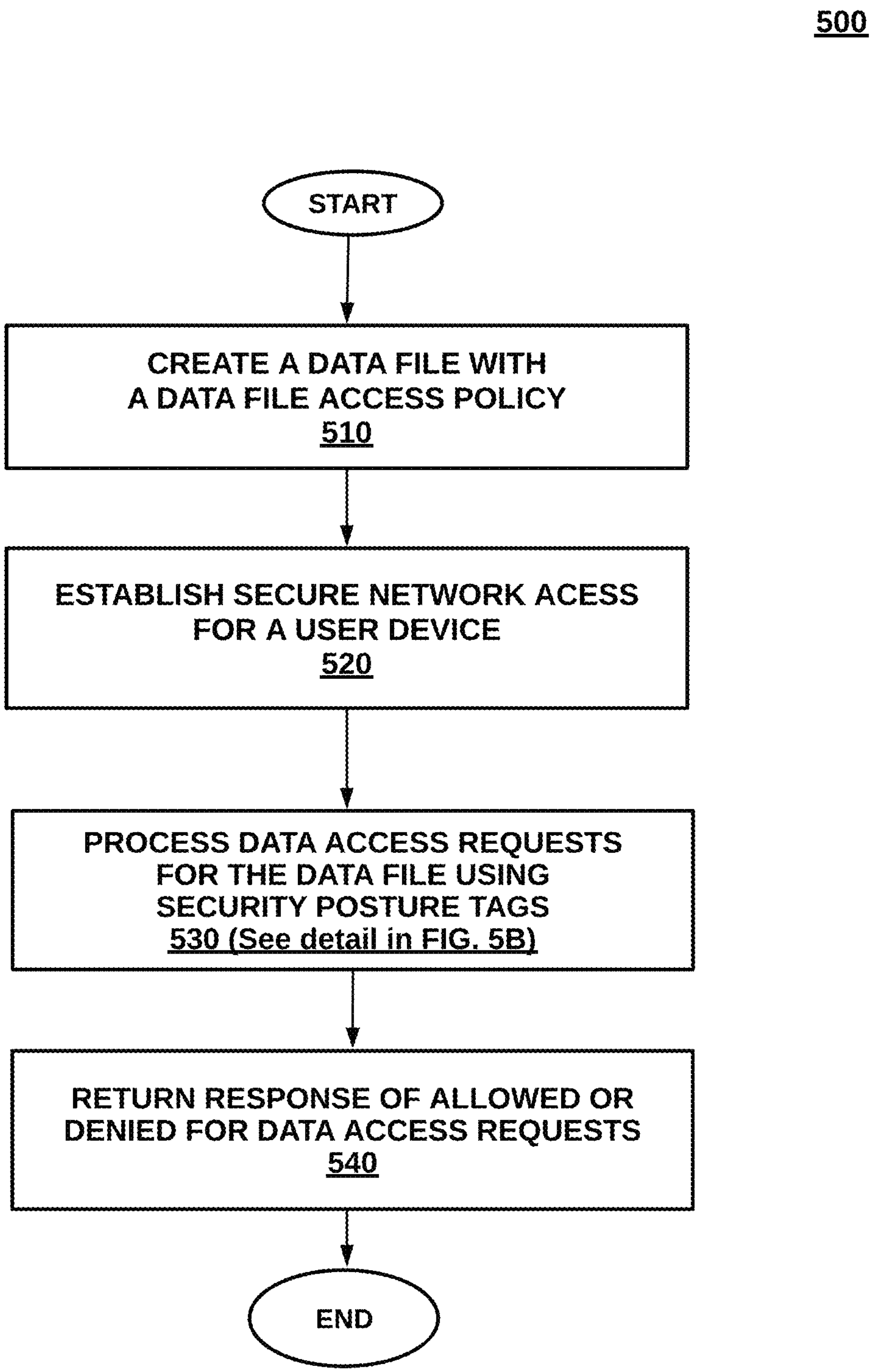
FIGS. 5A and 5B are high-level flow diagrams of a method for providing ZTAA based on security posture tags associated with APIs, according to an embodiment.
Figure 5B:
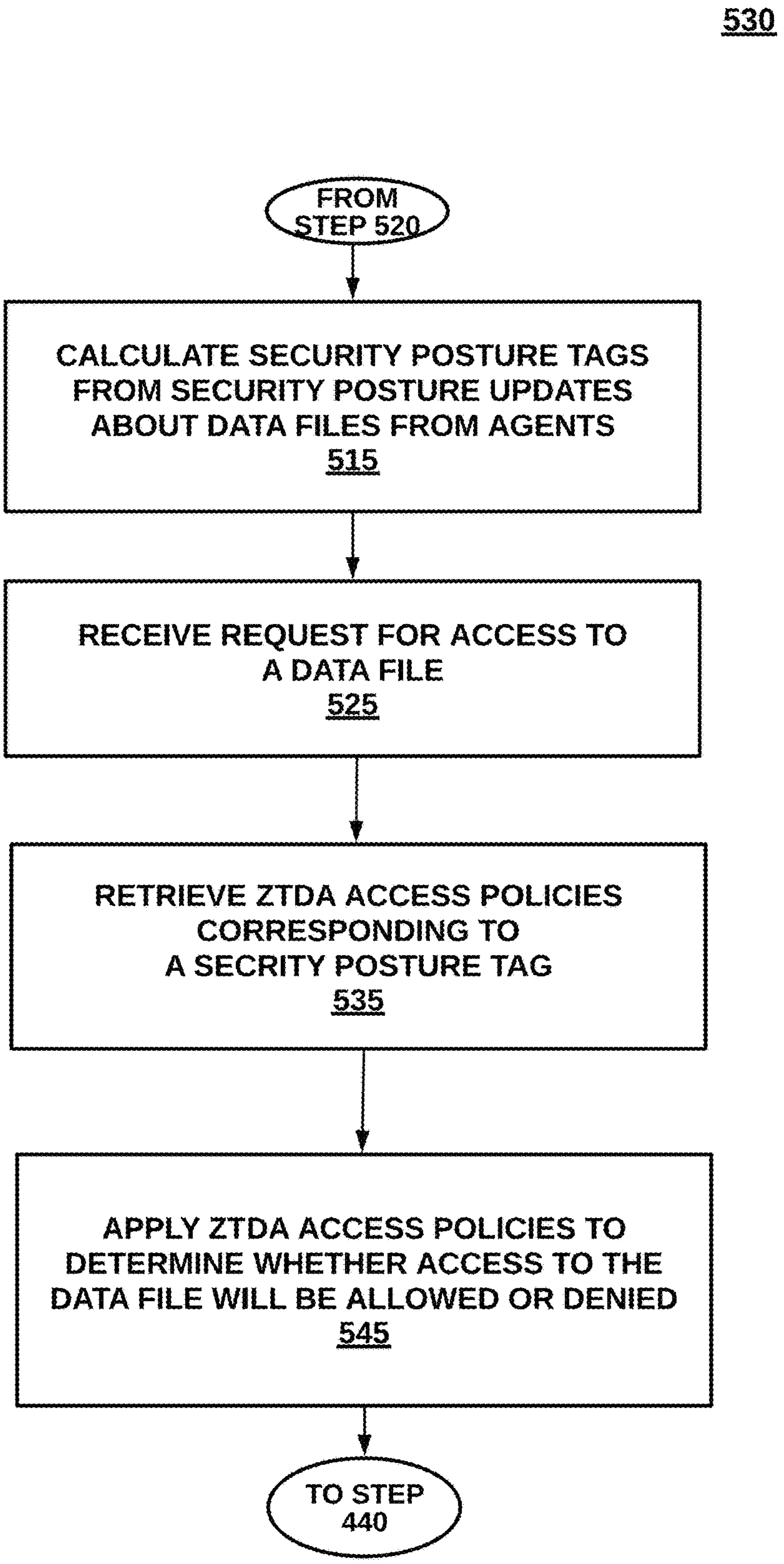

FIG. 5A is a high-level flow diagram of a method 400 for ZTDA based on security posture tags associated with data files, according to an embodiment. The method 500 can be implemented by, for example, system 100 of FIG. 1. The specific grouping of functionalities and order of steps are a mere example as many other variations of method 500 are possible, within the spirit of the present disclosure. Other variations are possible for different implementations.

At step 510, a new data file is created along with a corresponding data file access policy. At step 520, secure network access is established for a user device. At step 430, data access requests for the new data file are processed using security posture tags, as will be described more fully below. At step 540, access to the new data file is granted or denied based on processing.

Returning to step 530, FIG. 5B details an example of processing data access requests.

At step 515, security posture tags are calculated from security posture updates about data files gathered from a plurality of security posture agents executing on a plurality of network devices. The calculation can be done automatically or response to data access requests.

At step 525, a request is received for access including a name of a data file. The request has established secured network access (e.g., user device has been authenticated by VPN). The request does not include a specific location of the data file.

At step 535, one or more ZTDA network policies are retrieved as corresponding to a security posture tag associated with the data file is received.

At step 545, the one or more ZTDA network policies are applied to determine whether access to the data file will be allowed or denied. In some cases, access is allowed with some restrictions. A network administrator or a managing security software is able to override the decision.

III. Computing Device for ZTAA Using Security Posture Tags (FIG. 6)

FIG. 6 is a block diagram illustrating a computing device 600 for use in the system 100 of FIG. 1, according to one embodiment. The computing device 600 is a non-limiting example device for implementing each of the components of the system 100, including ZTAA server 110, network gateway 120, VPN server 122 and ZTNA server 124. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP ×84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer ⅔ routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL and FORTIPHISH families of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use.

The scope of the invention is defined by the following claims.

I claim:

1. A computer-implemented method in an Application Programming Interface (API) server device, on a data communication network, for providing zero trust API access (ZTAA) based on security posture tags associated with APIs, the method comprising:
- tracking API consumption rates associated with a plurality of APIs that are requested for consumption from network resources;
- receiving a request to consume a specific API, wherein the API consumption request is associated with a validated API key for a specific API of a plurality of APIs;
- responsive to the API consumption request, calculating a security posture tag for to the specific API by one or more agents running as daemons on one or more API network resources, wherein the daemons test the API network resources with API calls to generate initial security posture tags, and wherein the initial security posture tags are dynamically updated responsive to changes on the API network resources;
- identifying API security rules relevant to the security posture tag of the API; and
- allowing or denying access to the API for consumption per the API consumption request according to the API consumption rate in view of API security rules associated with the API.

2. The method of claim 1, wherein the consumption rate of the specific API is based on activity for more than one API resource device.

3. The method of claim 1, wherein the consumption rate of the specific API is based on activity for a specific API resource device of the plurality of API network resources.

4. The method of claim 1, wherein the information for the security posture updates are initiated by plurality of security agents upon identifying an internal operation relevant to network security.

5. The method of claim 1, wherein the ZTAA security posture tags are stored separately from corresponding data files.

6. The method of claim 1, wherein the request is allowed by the data access policies and not allowed by the network access policies.

7. The method of claim 1, wherein the API consumption request is received over a Virtual Private Network (VPN) security layer, subject to a VPN policy.

8. The method of claim 1, wherein the API consumption request has been approved for the API service over a Zero Trust Network Access (ZTNA) security layer, subject to a ZTNA policy.

9. The method of claim 1, wherein the API consumption request has been allowed to access a data file relevant to the API consumption request over a Zero Trust Data Access (ZTDA) security layer, subject to a ZTDA policy.

10. The method of claim 1, wherein the API consumption request comprises the validated API key as permission for use of the specific API, subject to a ZTDA security layer.

11. The method of claim 1, wherein the API consumption request clears VPN, ZTNA and ZTDA security layers, but is denied access to the specific API due to the consumption rate.

12. The method of claim 11, wherein the consumption rate for the specific API is based on consumption at different local area networks (LANs).

13. The method of claim 11, wherein the consumption rate for the specific API is based on consumption at different API network resources.

14. The method of claim 1, wherein the consumption rate comprises utilization for a group of APIs, including the specific API.

15. The method of claim 1, wherein the consumption rate comprises a specific pattern of APIs that are indicative of malicious activity, including the specific API.

16. A non-transitory computer-readable medium in an Application Programming Interface (API) server device, on a data communication network, for providing zero trust API access (ZTAA) based on security posture tags associated with APIs, the method comprising:
- tracking API consumption rates associated with a plurality of APIs that are requested for consumption from network resources;
- receiving a request to consume a specific API, wherein the API consumption request is associated with a validated API key for a specific API of a plurality of APIs;
- responsive to the API consumption request, calculating a security posture tag for to the specific API by one or more agents running as daemons on one or more API network resources, wherein the daemons test the API network resources with API calls to generate initial security posture tags, and wherein the initial security posture tags are dynamically updated responsive to changes on the API network resources;

identifying API security rules relevant to the security posture tag of the API; and allowing or denying access to the API for consumption per the API consumption request according to the API consumption rate in view of API security rules associated with the API.

17. An Application Programming Interface (API) server device, on a data communication network, for, on a data communication network, for providing zero trust API access (ZTAA) based on security posture tags associated with APIs, the API server device comprising:

a processor;

a network interface communicatively coupled to the processor and to a data communication network; and a memory, communicatively coupled to the processor and storing:

a security posture tag module to tracking API consumption rates associated with a plurality of APIs that are requested for consumption from network resources;

receiving a request to consume a specific API, wherein the API consumption request is associated with a validated API key for a specific API of a plurality of APIs;

responsive to the API consumption request, calculating a security posture tag for to the specific API by one or more agents running as daemons on one or more API network resources, wherein the daemons test the API network resources with API calls to generate initial security posture tags, and wherein the initial security posture tags are dynamically updated responsive to changes on the API network resources;

identifying API security rules relevant to the security posture tag of the API; and allowing or denying access to the API for consumption per the API consumption request according to the API consumption rate in view of API security rules associated with the API.

* * * * *